J. C. COLLINS.
SAUSAGE LINKING MACHINE.
APPLICATION FILED APR. 10, 1911.

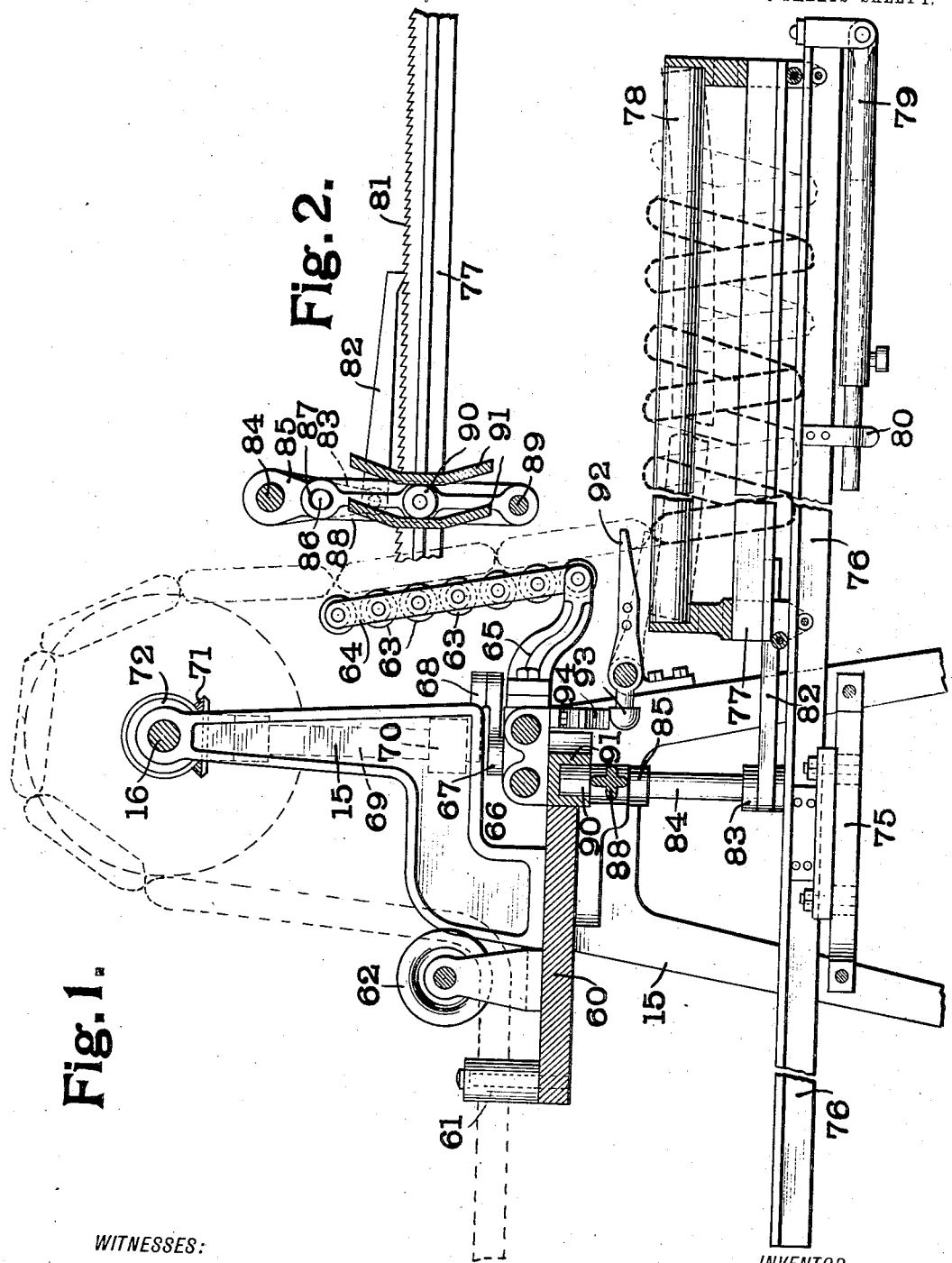

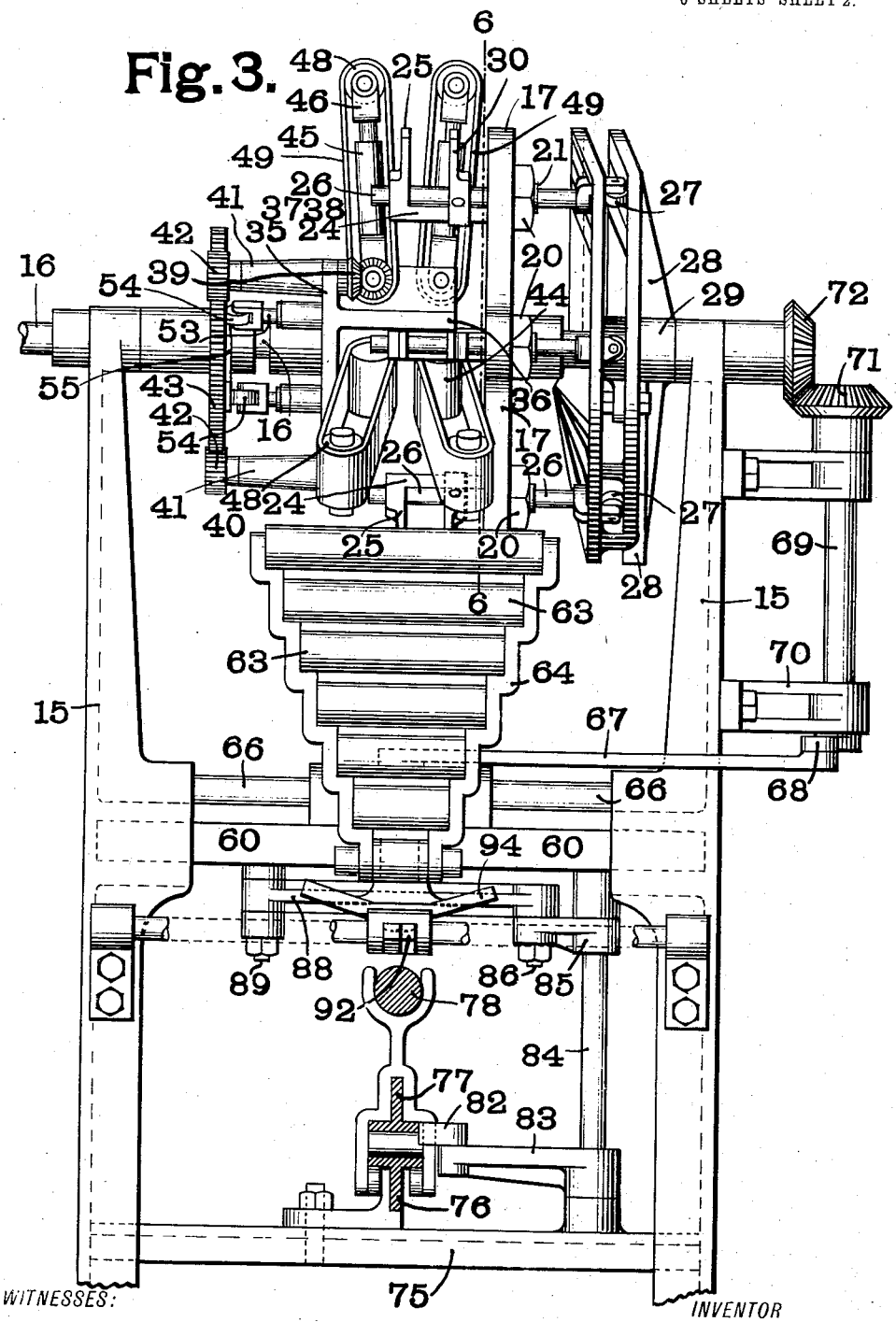

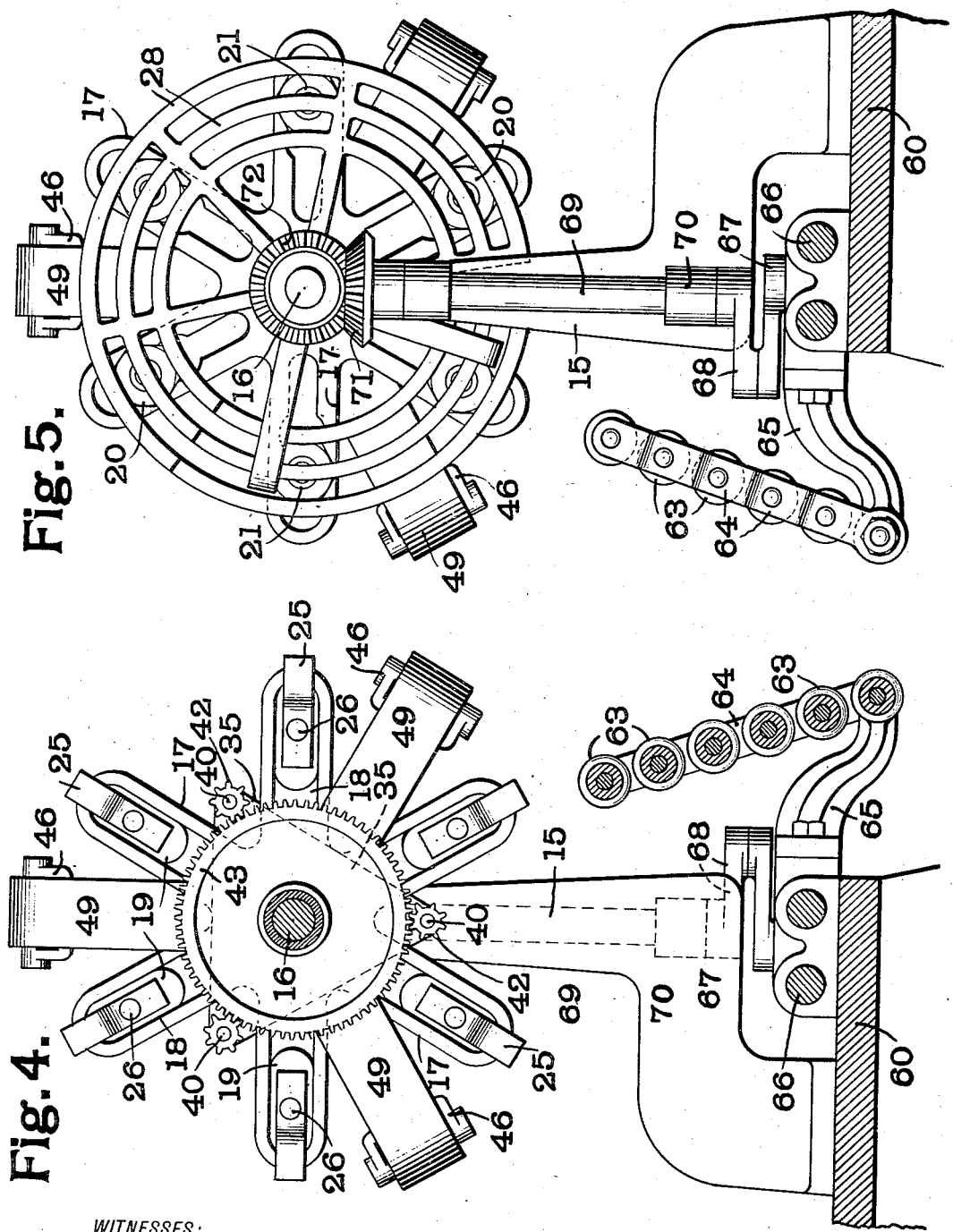

1,033,154.

Patented July 23, 1912.
6 SHEETS—SHEET 4.

WITNESSES:
L. L. Mead
W. H. Alexander

INVENTOR
John C. Collins
BY E. E. Huffman
ATTORNEY

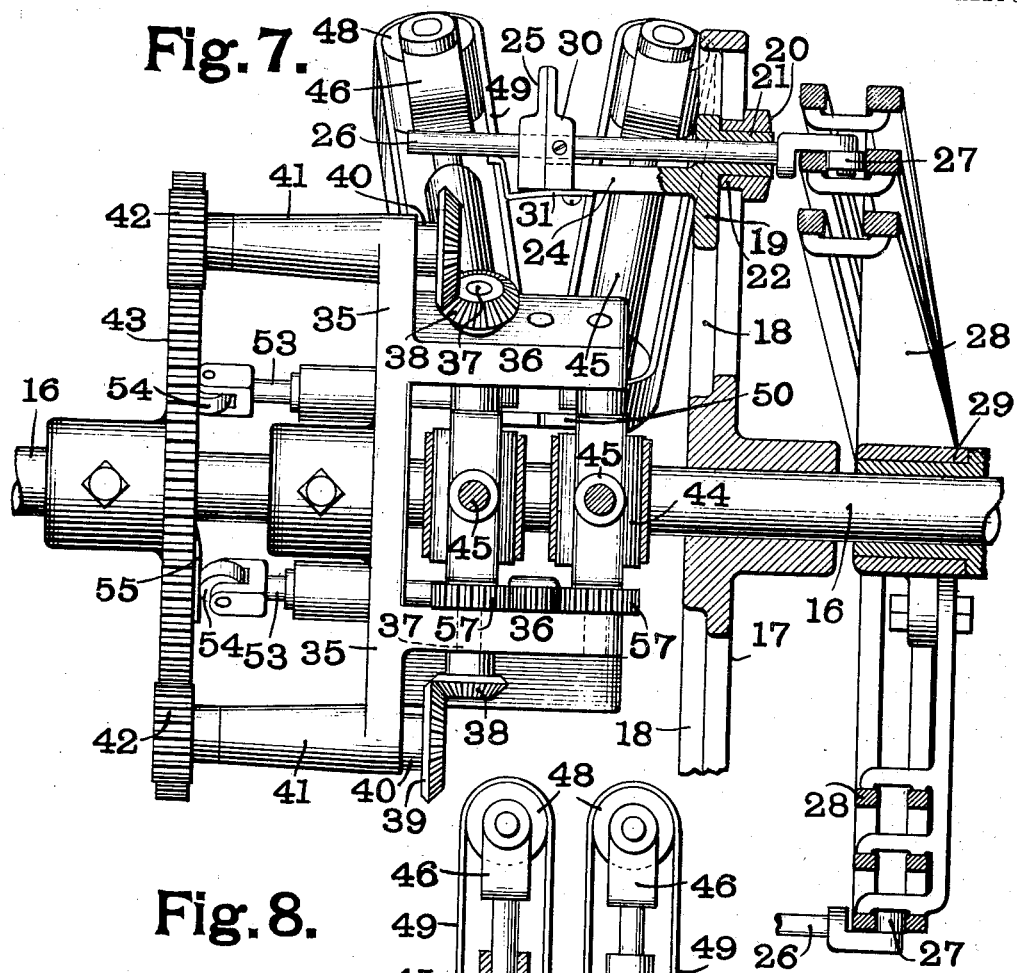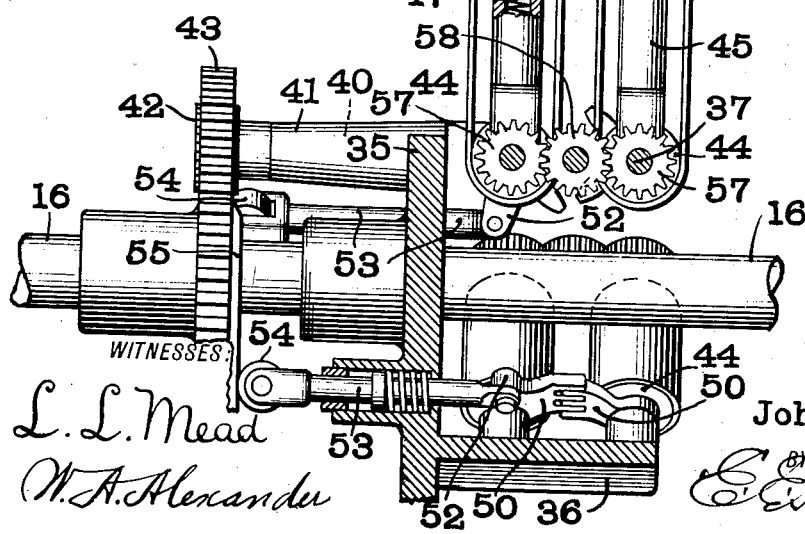

J. C. COLLINS.
SAUSAGE LINKING MACHINE.
APPLICATION FILED APR. 10, 1911.

1,033,154.

Patented July 23, 1912.
6 SHEETS—SHEET 6.

WITNESSES:
L. L. Mead,
W. A. Alexander.

INVENTOR
John C. Collins
BY
E. E. Huffman
ATTORNEY

UNITED STATES PATENT OFFICE.

JOHN C. COLLINS, OF ST. LOUIS, MISSOURI, ASSIGNOR TO GUS V. BRECHT BUTCHERS' SUPPLY COMPANY, OF ST. LOUIS, MISSOURI, A CORPORATION OF MISSOURI.

SAUSAGE-LINKING MACHINE.

1,033,154. Specification of Letters Patent. Patented July 23, 1912.

Application filed April 10, 1911. Serial No. 619,967.

*To all whom it may concern:*

Be it known that I, JOHN C. COLLINS, a citizen of the United States, residing at the city of St. Louis, Missouri, have invented a certain new and useful Sausage-Linking Machine, of which the following is such a full, clear, and exact description as will enable any one skilled in the art to which it appertains to make and use the same, reference being had to the accompanying drawings, forming part of this specification.

The object of my invention is to provide a machine which will rapidly divide cased sausage into links of uniform length without danger of injury to the sausage casing.

Another object of my invention is to provide means whereby the length of the link may be varied at will within certain predetermined limits.

Still another object of my invention is to provide means whereby the linked sausage will be delivered directly to the smoke house stick upon which the sausage is to be cured.

My invention consists in various novel elements and combinations of parts, all of which are fully described in the following specification and pointed out in the claims affixed hereto.

Figure 6:
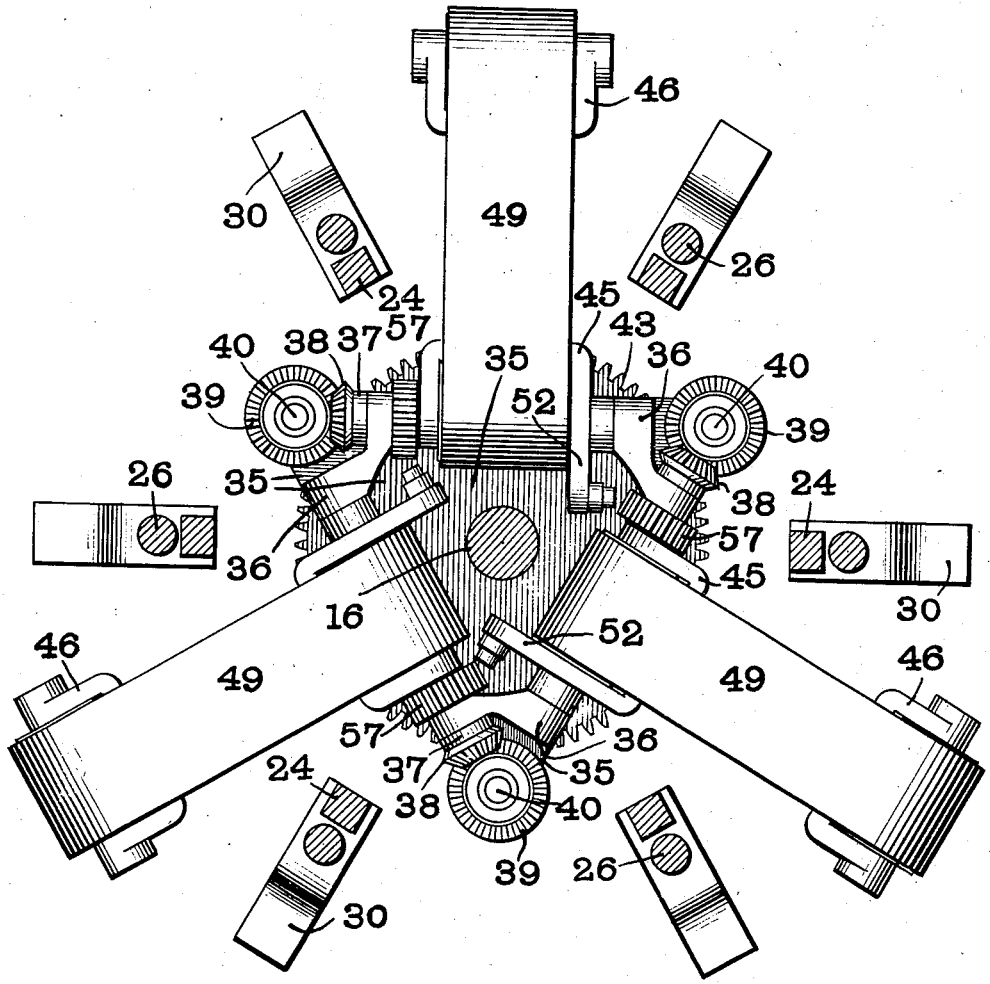
Figure 9:
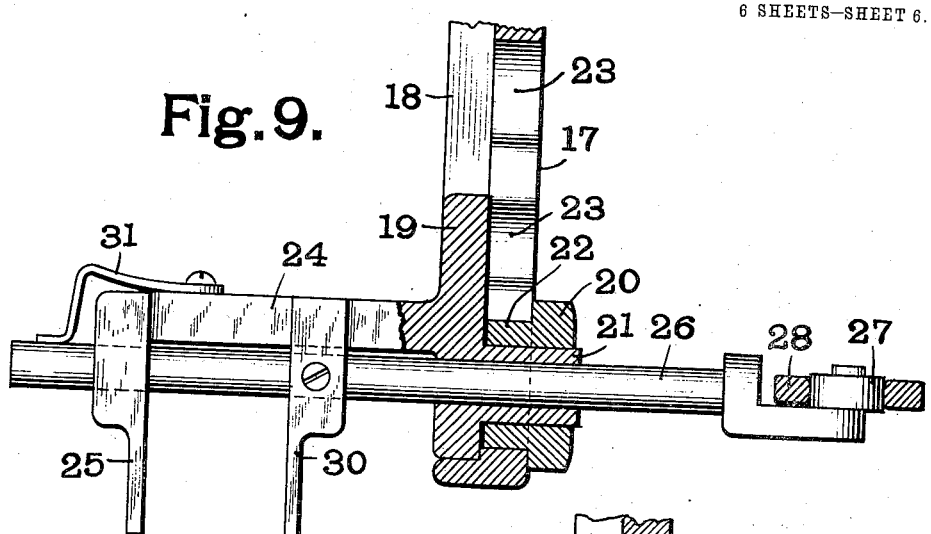
Figure 10:
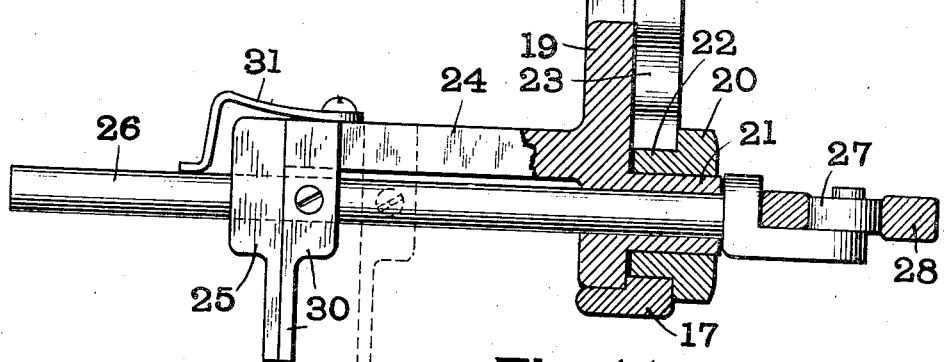
Figure 11:
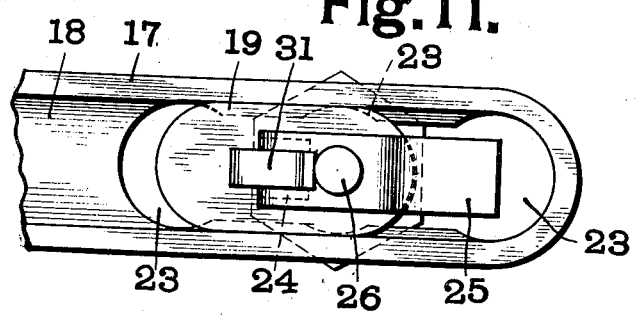

In the accompanying drawings which illustrate one form of sausage linking machine made in accordance with my invention, Figure 1 is a vertical longitudinal section some of the parts being omitted; Fig. 2 is a top plan view of the feeding mechanism for the receiving rack; Fig. 3 is an end elevation partly in section; Figs. 4 and 5 are a sectional view and side elevation respectively of the head or main portion of the machine; Fig. 6 is an enlarged section on the line 6—6 of Fig. 3; Figs. 7 and 8 are detailed sectional views showing the head of the machine, and Figs. 9, 10 and 11 are enlarged detailed views of the gripping and constricting mechanism.

Like marks of reference refer to similar parts in the several views of the drawings.

15 are side frames which carry the working parts of the machine. Journaled in the upper part of these side frames 15 is a shaft 16 to which power is imparted from any suitable source not shown. Carried by the shaft 16 is a spider 17 consisting of a number of radial arms. In the drawings these arms are shown as six in number but their number may be varied, if desired. Each arm of the spider 17 is provided with a channel or groove 18 in which slides a plate 19 shown in detail in Figs. 9, 10 and 11. This plate 19 is adapted to be secured in various positions by means of a nut 20 threaded on to a sleeve 21 carried by the plate 19 and provided with a cylindrical portion 22 adapted to engage with openings 23 in the web of the arm 17. These openings 23 are shown as three in number in the drawings so that three different lengths of link may be formed in the sausage by the machine.

Extending laterally from each of the plates 19 is an arm 24 provided at its end with a jaw 25 in which slides one end of a rod 26. The opposite end of the rod 26 passes through an opening in the sleeve 21 and is provided with an antifriction roller 27 engaging with a double cam 28 non-rotatably carried on a sleeve 29 formed on one of the side frames 15, as best shown in Fig. 7. Secured to the rod 26 is a jaw 30 which is adapted to coöperate with the jaw 25 to grip and constrict the sausage casing when the said jaws are moved together by the action of the cam 28 and the roller 27. In order to prevent play between the jaw 25 and the rod 26 in case of wear I provide an L-shaped spring 31 as best shown in Figs. 9 and 10.

Mounted on the shaft 16 at some distance from the spider 17 is a triangular plate 35. This plate 35 is provided with brackets 36, best shown in Figs. 6 and 7. Passing through each of these brackets 36 is a shaft 37 having mounted on one end a beveled gear wheel 38 meshing with a second beveled gear wheel 39 carried on a shaft 40 which shaft is journaled in a sleeve 41 carried on the plate 35 and is provided at the end opposite the beveled gear wheel 39 with a spur gear 42 which meshes with a large fixed gear wheel 43 carried by one of the side frames 15.

Rigidly secured to each of the shafts 37 is a roller 44. This roller 44 is impressed by the bifurcated end of a yoke 45 which is mounted to swing on the said shaft 37. This yoke 45 is adapted to telescopically receive the end of a second yoke 46, as best shown in Fig. 8. A spiral spring 47 is provided to force the two yokes 45 and 46 apart. The yoke 46 carries a roller 48 around which and the roller 44 passes a belt 49. The shafts 37 are arranged in tiers as best shown in Figs. 7 and 8 so that the belts 49 may be swung toward and away from each other to engage and rotate the links of sausage as will be hereinafter more fully described. In order to move the yokes 45 and 46 toward and away from each other, each of the yokes is provided with a segmental gear 50. The segmental gears 50 of each set of yokes 45 mesh, as is best shown in Fig. 8. The yoke 45 nearest to the plate 35 is provided with a crank arm 52 which is connected by a rod 53 passing through the plate 35 and provided on its end with an anti-friction roller 54 engaging a cam track 55 on the face of the fixed gear 43. In order to drive the belt passing around the rollers 44 and 48 of the yoke farthest from the plate 35 I secure to each of the shafts 37 a spur gear 57 which spur gears are connected by means of an idle gear 58, as best shown in Fig. 8.

Connecting the two side frames 15 is a bed plate 60 carrying upright guiding rolls 61 and a guiding sheave 62 which guides the cased sausage to the gripping and constricting mechanism, as is shown in dotted lines in Fig. 1. Passing around the gripping and constricting mechanism the sausage is delivered to a guiding device which consists of a number of rolls 63 mounted in a frame 64. This frame 64 is carried by a bracket 65 slidingly mounted upon a pair of guide rods 66. In order to impart lateral movement to the bracket 65 a link 67 connects the said bracket with a crank arm 68 on the lower end of a shaft 69, as best shown in Fig. 3. This shaft 69 is carried in brackets 70 on one of the side frames 15 and is provided at its upper end with a beveled gear wheel 71 meshing with a beveled gear wheel 72 upon the main shaft 16.

Arranged below the bed plate 60 is a second plate 75 carrying a T-bar 76 upon which is mounted a rack 77 adapted to receive a smoke house stick 78 upon which the linked sausage is to be deposited. The end of the T-bar 76 is supported by means of an adjustable foot 79 which is adapted to be folded up against the T-bar 76 and held in position by means of a spring 80, as shown in Fig. 1 when the machine is moved from one position to another. In order to feed the rack 77 intermittently along the T-bar 76 I provide one edge of the said rack with teeth 81, as shown in Fig. 2. These teeth 81 are engaged by means of a pawl 82 pivoted to the end of an arm 83 carried by a rock shaft 84 as best shown in Fig. 3. The upper end of this rock shaft 84 is provided with an arm 85 provided with a pin 86. This pin 86 engages with a slot 87 in an arm 88 which is pivoted at its opposite end to a stud 89 depending from the bed plate 60. The arm 88 is provided with a roll 90 engaging with a double cam 91 carried by the bracket 65 so that when the said bracket 65 is moved laterally the arm 88 will be swung on its pivot to actuate the pawl 82 and feed the rack 77. The smoke house stick 78 is liable to become warped so as to assume a position similar to that shown in dotted lines in Fig. 1. In order therefore that there may be a fixed point of delivery from the guiding device 64 I interpose between the said guiding device and the rack 77 a finger 92 which is normally held in horizontal position as shown in Fig. 1, by means of a rearward projection 93 which engages with a cam surface 94 carried on the lower face of the bracket 65. When, however, the bracket 65 is moved toward either end of its stroke the cam surface 94 allows the finger 92 to drop down into the position shown in dotted lines and thus facilitate the discharge of the sausage from the finger on to the smoke house stick.

The operation of my machine is as follows: The cased sausage is brought to the machine between the upright guide rolls 61 and around the shaft 62 whence it passes to the head of the machine and is engaged by the gripping and constricting jaws 25 and 30. As soon as the sausage has passed between these jaws they are brought together by the action of the double cam 28 on the anti-friction roll 27 and held in this position until each alternate link has been engaged by the belts 49 and rotated so as to twist the parts of the sausage casing connecting the various links thus forming permanent division lines between the various links. After passing around to the opposite side of the head of the machine the sausage is released by the separation of the jaws 25 and 30 and the sausage which is now formed into links is guided by means of the laterally moving guiding device 94 first to one side and then to the other of the smoke house stick 78 so as to deposit the sausage first upon one side of the said stick and then upon the other. Between each movement of the brackets 65 the rack 77 carrying the smoke house stick is moved forward by means of the engagement of the pawl 82 with the teeth 81 of the rack 77. As soon as the smoke house stick 78 has the sausage deposited upon its entire length it is removed from the rack 77 and a new stick inserted. The transfer of the sausage after it leaves the machine is thus avoided.

Having fully described my invention, what I claim as new and desire to secure by Letters Patent of the United States, is:

1. In a sausage linking machine, the combination with a member provided with means for gripping and constricting the cased sausage to form links, of means for rotating the links between constrictions, said rotating means being capable of forward movement together with the sausage.

2. In a sausage linking machine, the combination with a member provided with means for gripping and constricting the cased sausage to form links, of belts for rotating the links between constrictions, said belts being capable of forward movement together with the sausage.

3. In a sausage linking machine, the combination with a movable member provided with means for gripping and constricting the cased sausage to form links, of means for rotating the links between constrictions, said rotating means being capable of forward movement together with the sausage.

4. In a sausage linking machine, the combination with a movable member provided with means for gripping and constricting the cased sausage to form links, of belts for rotating the links between constrictions, said belts being capable of forward movement together with the sausage.

5. In a sausage linking machine, the combination with a rotary member provided with means for gripping and constricting the cased sausage to form links, of means for rotating the links between constrictions, said rotating means being capable of forward movement together with the sausage.

6. In a sausage linking machine, the combination with a rotary member provided with means for gripping and constricting the cased sausage to form links, of belts for rotating the links between constrictions, said rotating means being capable of forward movement together with the sausage.

7. In a sausage linking machine, the combination with a movable member provided with means for gripping and constricting the cased sausage to form links, of belts carried by said movable member and adapted to engage and rotate links between constrictions.

8. In a sausage linking machine, the combination with a rotary member provided with means for gripping and constricting the cased sausage to form links, of belts carried by said rotary member for engaging and rotating links between constrictions.

9. In a sausage linking machine, the combination with rotary means for gripping and constricting the cased sausage to form links, said means being radially adjustable to form links of different lengths, of means for rotating links between constrictions.

10. In a sausage linking machine, the combination with rotary means for gripping and constricting the cased sausage to form links, said means being radially adjustable to form links of different lengths, of belts adapted to engage said links and rotate the same.

11. In a sausage linking machine, the combination with means for gripping and constricting the cased sausage to form links, of a pair of pivotally mounted belts adapted to swing into and out of engagement with the links, and means for actuating said belts to rotate the links.

12. In a sausage linking machine, the combination with means for gripping and constricting the cased sausage to form links, of a pair of spring frames, belts rotatably mounted on said frames, and means for moving said frames to carry said belts into and out of engagement with the links.

13. In a sausage linking machine, the combination with means for gripping and constricting the cased sausage to form links, of a pair of pivotally mounted spring frames, belts rotatably mounted on said frames, and means for swinging said pivoted frames to bring said belts into and out of engagement with the links.

14. In a sausage linking machine, the combination with a rotary member provided with means for gripping and constricting the cased sausage to form links, of pivotally mounted belt frames arranged in pairs intermediate of said gripping means, and operating connections for swinging the frames of each pair toward and away from each other to engage and release the links.

15. In a sausage linking machine, the combination with a rotary member provided with means for gripping and constricting the cased sausage to form links, of pivotally mounted belt frames arranged in pairs intermediate of said gripping means, operating connections for swinging the frames of each pair toward and away from each other to engage and release the links, belts on said frames, and planetary gearing to drive said belts.

16. In a sausage linking machine, the combination with a rotary member provided with means for gripping and constricting the cased sausage to form links, of pivotally mounted belt frames arranged in pairs intermediate of said gripping means, cams and operating connections for swinging the frames of each pair toward and away from each other to engage and release the links, belts on said frames, planetary gearing for driving said belts, and cams for operating said gripping means.

In testimony whereof, I have hereunto set my hand and affixed my seal in the presence of the two subscribing.

JOHN C. COLLINS. [L. S.]

Witnesses:
 JOHN P. KELLEHER,
 C. FRANKEL.